(12) United States Patent
Polley et al.

(10) Patent No.: US 8,433,790 B2
(45) Date of Patent: Apr. 30, 2013

(54) SYSTEM AND METHOD FOR ASSIGNING NETWORK BLOCKS TO SENSORS

(75) Inventors: Jonathan Polley, Baltimore, MD (US); William Andrew Vogel, III, Baltimore, MD (US)

(73) Assignee: Sourcefire, Inc., Columbia, MD (US)

( * ) Notice: Subject to any disclaimer, the term of this patent is extended or adjusted under 35 U.S.C. 154(b) by 100 days.

(21) Appl. No.: 12/813,859

(22) Filed: Jun. 11, 2010

(65) Prior Publication Data

US 2011/0307600 A1 Dec. 15, 2011

(51) Int. Cl.
*G06F 15/173* (2006.01)

(52) U.S. Cl.
USPC ............. 709/224; 709/209; 709/223; 726/11; 726/23; 370/328

(58) Field of Classification Search .................... 709/224
See application file for complete search history.

(56) References Cited

U.S. PATENT DOCUMENTS

| | | |
|---|---|---|
| 4,550,436 A | 10/1985 | Freeman |
| 4,570,157 A | 2/1986 | Kodaira |
| 4,857,912 A | 8/1989 | Everett et al. |
| 4,912,748 A | 3/1990 | Horii et al. |
| 4,985,863 A | 1/1991 | Fujisawa et al. |
| 5,193,192 A | 3/1993 | Seberger |
| 5,222,081 A | 6/1993 | Lewis et al. |
| 5,404,488 A | 4/1995 | Kerrigan et al. |
| 5,430,842 A | 7/1995 | Thompson et al. |
| 5,459,841 A | 10/1995 | Flora-Holmquist et al. |
| 5,495,409 A | 2/1996 | Kanno |
| 5,497,463 A | 3/1996 | Stein et al. |
| 5,604,910 A | 2/1997 | Kojima et al. |
| 5,666,293 A | 9/1997 | Metz et al. |
| 5,796,942 A | 8/1998 | Esbensen |
| 5,870,554 A | 2/1999 | Grossman et al. |
| 5,881,269 A | 3/1999 | Dobbelstein |
| 5,901,307 A | 5/1999 | Potter et al. |
| 5,917,821 A | 6/1999 | Gobuyan et al. |
| 5,919,257 A | 7/1999 | Trostle |
| 5,963,942 A | 10/1999 | Igata |

(Continued)

FOREIGN PATENT DOCUMENTS

| | | |
|---|---|---|
| EP | 2166725 A1 | 3/2010 |
| GB | 2 432 933 A | 6/2007 |

(Continued)

OTHER PUBLICATIONS

International Search Report and Written Opinion of the International Searching Authority issued on Sep. 1, 2011 in connection with PCT application No. PCT/US2011/035874, which corresponds to U.S. Appl. No. 12/820,227.

(Continued)

*Primary Examiner* — Hua Fan
(74) *Attorney, Agent, or Firm* — Posz Law Group, PLC

(57) ABSTRACT

A system includes a processor device. The processor device is configured to detect a physical topology of a network comprising hosts and sensors in the network. The processor device is also configured to generate a sensor policy for assignment of the sensors to network blocks of the hosts, that balances a processing load and accuracy of the sensors in the network based on physical closeness of the sensors to different divisions of hosts within a same network block.

17 Claims, 5 Drawing Sheets

U.S. PATENT DOCUMENTS

| | | | |
|---|---|---|---|
| 5,987,473 A | 11/1999 | Jorgensen | |
| 5,995,963 A | 11/1999 | Nanba et al. | |
| 5,999,937 A | 12/1999 | Ellard | |
| 6,002,427 A | 12/1999 | Kipust | |
| 6,141,686 A | 10/2000 | Jackowski et al. | |
| 6,199,181 B1 | 3/2001 | Rechef et al. | |
| 6,219,786 B1 | 4/2001 | Cunningham et al. | |
| 6,259,805 B1 | 7/2001 | Freedman et al. | |
| 6,320,848 B1 | 11/2001 | Edwards et al. | |
| 6,321,338 B1 | 11/2001 | Porras et al. | |
| 6,324,656 B1 | 11/2001 | Gleichauf et al. | |
| 6,334,121 B1 | 12/2001 | Primeaux et al. | |
| 6,343,362 B1 | 1/2002 | Ptacek et al. | |
| 6,393,474 B1 | 5/2002 | Eichert et al. | |
| 6,415,321 B1 | 7/2002 | Gleichauf et al. | |
| 6,453,354 B1 | 9/2002 | Jiang et al. | |
| 6,477,648 B1 | 11/2002 | Schell et al. | |
| 6,487,666 B1 | 11/2002 | Shanklin et al. | |
| 6,499,107 B1 | 12/2002 | Gleichauf et al. | |
| 6,539,381 B1 | 3/2003 | Prasad et al. | |
| 6,546,493 B1 | 4/2003 | Magdych et al. | |
| 6,587,876 B1 | 7/2003 | Mahon et al. | |
| 6,590,885 B1 | 7/2003 | Jorgensen | |
| 6,678,734 B1 | 1/2004 | Haatainen et al. | |
| 6,678,824 B1 | 1/2004 | Cannon et al. | |
| 6,684,332 B1 | 1/2004 | Douglas | |
| 6,711,127 B1 | 3/2004 | Gorman et al. | |
| 6,754,826 B1 | 6/2004 | Challenger et al. | |
| 6,766,320 B1 | 7/2004 | Wang et al. | |
| 6,772,196 B1 | 8/2004 | Kirsch et al. | |
| 6,789,202 B1 | 9/2004 | Ko et al. | |
| 6,816,973 B1 | 11/2004 | Gleichauf et al. | |
| 6,851,061 B1 | 2/2005 | Holland et al. | |
| 6,957,348 B1 | 10/2005 | Flowers et al. | |
| 6,983,323 B2 | 1/2006 | Cantrell et al. | |
| 6,993,706 B2 | 1/2006 | Cook | |
| 6,999,998 B2 | 2/2006 | Russell | |
| 7,032,114 B1 | 4/2006 | Moran | |
| 7,054,930 B1 | 5/2006 | Cheriton | |
| 7,058,821 B1 | 6/2006 | Parekh et al. | |
| 7,065,657 B1 | 6/2006 | Moran | |
| 7,073,198 B1 | 7/2006 | Flowers et al. | |
| 7,076,803 B2 | 7/2006 | Bruton et al. | |
| 7,096,503 B1 | 8/2006 | Magdych et al. | |
| 7,113,789 B1 | 9/2006 | Boehmke | |
| 7,133,916 B2 | 11/2006 | Schunemann | |
| 7,134,141 B2 | 11/2006 | Crosbie et al. | |
| 7,152,105 B2 | 12/2006 | McClure et al. | |
| 7,174,566 B2 | 2/2007 | Yadav | |
| 7,181,769 B1 | 2/2007 | Keanini et al. | |
| 7,231,665 B1 | 6/2007 | McArdle et al. | |
| 7,243,148 B2 | 7/2007 | Keir et al. | |
| 7,257,630 B2 | 8/2007 | Cole et al. | |
| 7,305,708 B2 | 12/2007 | Norton et al. | |
| 7,310,688 B1 | 12/2007 | Chin | |
| 7,313,695 B2 | 12/2007 | Norton et al. | |
| 7,315,801 B1 | 1/2008 | Dowd et al. | |
| 7,317,693 B1 | 1/2008 | Roesch et al. | |
| 7,346,922 B2 | 3/2008 | Miliefsky | |
| 7,350,077 B2 | 3/2008 | Meier et al. | |
| 7,363,656 B2 | 4/2008 | Weber et al. | |
| 7,365,872 B2 | 4/2008 | Lawrence et al. | |
| 7,467,202 B2 | 12/2008 | Savchuk | |
| 7,467,205 B1 | 12/2008 | Dempster et al. | |
| 7,467,410 B2 | 12/2008 | Graham et al. | |
| 7,493,388 B2 | 2/2009 | Wen et al. | |
| 7,496,662 B1 | 2/2009 | Roesch et al. | |
| 7,496,962 B2 | 2/2009 | Roelker et al. | |
| 7,519,954 B1 | 4/2009 | Beddoe et al. | |
| 7,539,681 B2 | 5/2009 | Norton et al. | |
| 7,580,370 B2 * | 8/2009 | Boivie et al. | 370/255 |
| 7,594,273 B2 | 9/2009 | Keanini et al. | |
| 7,596,807 B2 | 9/2009 | Ptacek et al. | |
| 7,644,275 B2 | 1/2010 | Mowers et al. | |
| 7,664,845 B2 | 2/2010 | Kurtz et al. | |
| 7,673,043 B2 | 3/2010 | Keir et al. | |
| 7,680,929 B1 | 3/2010 | Lyon | |
| 7,701,945 B2 | 4/2010 | Roesch et al. | |
| 7,716,742 B1 | 5/2010 | Roesch et al. | |
| 7,730,011 B1 | 6/2010 | Deninger et al. | |
| 7,730,175 B1 | 6/2010 | Roesch et al. | |
| 7,733,803 B2 | 6/2010 | Vogel, III et al. | |
| 7,801,980 B1 | 9/2010 | Roesch et al. | |
| 7,805,762 B2 | 9/2010 | Rowland | |
| 7,885,190 B1 | 2/2011 | Roesch et al. | |
| 7,949,732 B1 | 5/2011 | Roesch et al. | |
| 8,020,211 B2 | 9/2011 | Keanini et al. | |
| 8,041,773 B2 * | 10/2011 | Abu-Ghazaleh et al. | 709/209 |
| 8,272,055 B2 | 9/2012 | Wease | |
| 8,289,882 B2 | 10/2012 | Vogel, III et al. | |
| 2001/0027485 A1 | 10/2001 | Ogishi et al. | |
| 2001/0034847 A1 | 10/2001 | Gaul, Jr. | |
| 2002/0035639 A1 | 3/2002 | Xu | |
| 2002/0066034 A1 | 5/2002 | Schlossberg | |
| 2002/0083344 A1 | 6/2002 | Vairavan | |
| 2002/0087716 A1 | 7/2002 | Mustafa | |
| 2002/0112185 A1 | 8/2002 | Hodges | |
| 2002/0123995 A1 | 9/2002 | Shibuya | |
| 2002/0143918 A1 * | 10/2002 | Soles et al. | 709/223 |
| 2002/0165707 A1 | 11/2002 | Call | |
| 2003/0009699 A1 | 1/2003 | Gupta et al. | |
| 2003/0014662 A1 | 1/2003 | Gupta et al. | |
| 2003/0046388 A1 | 3/2003 | Milliken | |
| 2003/0065817 A1 | 4/2003 | Benchetrit et al. | |
| 2003/0083847 A1 | 5/2003 | Schertz et al. | |
| 2003/0093517 A1 | 5/2003 | Tarquini et al. | |
| 2003/0101353 A1 | 5/2003 | Tarquini et al. | |
| 2003/0126472 A1 | 7/2003 | Banzhof | |
| 2003/0140250 A1 | 7/2003 | Taninaka et al. | |
| 2003/0195874 A1 | 10/2003 | Akaboshi | |
| 2003/0212779 A1 | 11/2003 | Boyter et al. | |
| 2003/0212910 A1 | 11/2003 | Rowland et al. | |
| 2003/0217283 A1 | 11/2003 | Hrastar et al. | |
| 2003/0229726 A1 | 12/2003 | Daseke et al. | |
| 2004/0010684 A1 | 1/2004 | Douglas | |
| 2004/0015728 A1 | 1/2004 | Cole et al. | |
| 2004/0034773 A1 | 2/2004 | Balabine et al. | |
| 2004/0064726 A1 | 4/2004 | Girouard | |
| 2004/0073800 A1 | 4/2004 | Shah et al. | |
| 2004/0093408 A1 | 5/2004 | Hirani et al. | |
| 2004/0093582 A1 | 5/2004 | Segura | |
| 2004/0098618 A1 | 5/2004 | Kim et al. | |
| 2004/0123153 A1 | 6/2004 | Wright et al. | |
| 2004/0172234 A1 | 9/2004 | Dapp et al. | |
| 2004/0179477 A1 | 9/2004 | Lincoln et al. | |
| 2004/0193943 A1 | 9/2004 | Angelino et al. | |
| 2004/0210756 A1 | 10/2004 | Mowers et al. | |
| 2004/0218532 A1 | 11/2004 | Khirman | |
| 2004/0221176 A1 | 11/2004 | Cole | |
| 2004/0250032 A1 | 12/2004 | Ji et al. | |
| 2004/0268358 A1 | 12/2004 | Darling et al. | |
| 2005/0005169 A1 | 1/2005 | Kelekar | |
| 2005/0015623 A1 | 1/2005 | Williams et al. | |
| 2005/0044422 A1 | 2/2005 | Cantrell et al. | |
| 2005/0076066 A1 | 4/2005 | Stakutis et al. | |
| 2005/0108393 A1 | 5/2005 | Banerjee et al. | |
| 2005/0113941 A1 | 5/2005 | Ii et al. | |
| 2005/0114700 A1 | 5/2005 | Barrie et al. | |
| 2005/0160095 A1 | 7/2005 | Dick et al. | |
| 2005/0172019 A1 | 8/2005 | Williamson et al. | |
| 2005/0188079 A1 | 8/2005 | Motsinger et al. | |
| 2005/0223014 A1 | 10/2005 | Sharma et al. | |
| 2005/0229255 A1 | 10/2005 | Gula et al. | |
| 2005/0240604 A1 | 10/2005 | Corl, Jr. et al. | |
| 2005/0251500 A1 | 11/2005 | Vahalia et al. | |
| 2005/0268331 A1 | 12/2005 | Le et al. | |
| 2005/0268332 A1 | 12/2005 | Le et al. | |
| 2005/0273673 A1 | 12/2005 | Gassoway | |
| 2005/0273857 A1 | 12/2005 | Freund | |
| 2006/0174337 A1 | 8/2006 | Bernoth | |
| 2006/0265748 A1 | 11/2006 | Potok | |
| 2006/0288053 A1 | 12/2006 | Holt et al. | |
| 2006/0294588 A1 | 12/2006 | Lahann et al. | |
| 2007/0027913 A1 | 2/2007 | Jensen et al. | |
| 2007/0058631 A1 | 3/2007 | Mortier et al. | |
| 2007/0143852 A1 | 6/2007 | Keanini et al. | |
| 2007/0162463 A1 | 7/2007 | Kester et al. | |

| | | | |
|---|---|---|---|
| 2007/0192286 A1 | 8/2007 | Norton et al. | |
| 2007/0192863 A1 | 8/2007 | Kapoor et al. | |
| 2007/0195797 A1 | 8/2007 | Patel et al. | |
| 2007/0271371 A1 | 11/2007 | Singh Ahuja et al. | |
| 2007/0283007 A1 | 12/2007 | Keir et al. | |
| 2007/0283441 A1 | 12/2007 | Cole et al. | |
| 2007/0288579 A1 | 12/2007 | Schunemann | |
| 2008/0115213 A1 | 5/2008 | Bhatt et al. | |
| 2008/0127342 A1 | 5/2008 | Roesch et al. | |
| 2008/0133523 A1 | 6/2008 | Norton et al. | |
| 2008/0168561 A1 | 7/2008 | Durie et al. | |
| 2008/0196102 A1 | 8/2008 | Roesch | |
| 2008/0209518 A1 | 8/2008 | Sturges et al. | |
| 2008/0244741 A1 | 10/2008 | Gustafson et al. | |
| 2008/0263197 A1 | 10/2008 | Stephens | |
| 2008/0276319 A1 | 11/2008 | Rittermann | |
| 2008/0289040 A1 | 11/2008 | Ithal | |
| 2009/0019141 A1 | 1/2009 | Bush et al. | |
| 2009/0028147 A1 | 1/2009 | Russell | |
| 2009/0041020 A1 | 2/2009 | Gibbons et al. | |
| 2009/0055691 A1* | 2/2009 | Ouksel et al. | 714/48 |
| 2009/0164517 A1 | 6/2009 | Shields et al. | |
| 2009/0182864 A1 | 7/2009 | Khan et al. | |
| 2009/0259748 A1 | 10/2009 | McClure et al. | |
| 2009/0262659 A1 | 10/2009 | Sturges et al. | |
| 2009/0271696 A1 | 10/2009 | Bailor et al. | |
| 2009/0282481 A1 | 11/2009 | Dow et al. | |
| 2009/0320138 A1 | 12/2009 | Keanini et al. | |
| 2010/0050260 A1 | 2/2010 | Nakakoji et al. | |
| 2010/0088767 A1 | 4/2010 | Wease | |
| 2010/0161795 A1 | 6/2010 | Deridder et al. | |
| 2011/0314143 A1 | 12/2011 | Vogel, III et al. | |
| 2012/0233222 A1 | 9/2012 | Roesch | |

FOREIGN PATENT DOCUMENTS

| | | |
|---|---|---|
| WO | WO 01/37511 A2 | 5/2001 |
| WO | WO 2004/100011 A1 | 11/2004 |
| WO | WO 2005/064884 A1 | 7/2005 |
| WO | WO 2006/025050 A2 | 3/2006 |
| WO | WO 2009/032925 A1 | 3/2009 |

OTHER PUBLICATIONS

Francois Gagnon et al.: "A Hybrid Approach to Operating System Discovery using Answer Set Programming", Integrated Network Management, 2007. IM'07, 10$^{th}$ IFIP/IEEE International Symposium on, IEEE, PI, May 1, 2007, pp. 391-400, XP031182713, ISBN: 978-1-4244-0798-9, p. 293, 394-397.
Final Office Action issued by the U.S. Patent Office on Sep. 14, 2011 in connection with related U.S. Appl. No. 12/230,338.
Office Action issued by the U.S. Patent Office on Oct. 21, 2011 in connection with related U.S. Appl. No. 12/969,682.
Notice of Allowance issued by the Japanese Patent Office on Sep. 30, 2011 in connection with Japanese Patent Application No. 2007-523640, which corresponds to related U.S. Appl. No. 10/898,220, now U.S. Patent No. 7,539,681.
Notice of Allowance issued the by U.S. Patent Office on Oct. 28, 2011 in connection with related U.S. Appl. No. 12/149,196.
Advisory Action issued by the U.S. Patent Office on Nov. 28, 2011 in connection with related U.S. Appl. No. 12/230,338.
U.S. Appl. No. 12/969,682, filed Dec. 2010, Roesch et al.
Notice of Allowance issued by the U.S. Patent Office on Oct. 5, 2010 in connection with related U.S. Appl. No. 10/843,374.
International Preliminary Report on Patentability mailed on Oct. 19, 2010 in connection with PCT application No. PCT/US2009/02210, which corresponds to U.S. Appl. No. 12/230,338.
Final Office Action issued by the U.S. Patent Office on Oct. 25, 2010 in connection with related U.S. Appl. No. 11/272,035.
Final Office Action issued by the U.S. Patent Office on Nov. 4, 2010 in connection with related U.S. Appl. No. 10/843,459.
Office Action issued by the U.S. Patent Office on Nov. 19, 2010 in connection with related U.S. Appl. No. 10/843,459.
Final Office Action issued by the U.S. Patent Office on Nov. 24, 2010 in connection with related U.S. Appl. No. 12/010,900.
Office Action issued by the U.S. Patent Office on Dec. 22, 2010 in connection with related U.S. Appl. No. 11/905,980.

"Snort™ Users Manual 2.2.0RC1," *The Snort Project*, Jun. 28, 2004, Retrieved from the Internet: URL:http://cvs.snort.org/viewcvs.cgi/*checkout*/snort/doc/snort_manual.pdf?rev=1.25&content-type=application/pdf [retrieved on Nov. 18, 2010] (XP002610157).
V. Yegneswaran, et al., "Internet Sieve: An Architecture for Generating Resilient Signatures," May 2004, Retrieved from the Internet: URL:http://www.cc.gatech.edu/~giffin/papers/tr1507/tr1507.pdf [retrieved on Nov. 18, 2010] (XP002610154).
D. Roekler, "HTTP IDS Evasions Revisited," Jan. 8, 2003, Retrieved from the Internet: URL:http://docs.idsresearch.org/http_ids_evasions.pdf [Nov. 18, 2010] (XP002610155).
M. Norton, et al., "The New Snort," *Computer Security Journal*, CSI Security Institute, XIX, No. 3 (Jan. 1, 2003), pp. 37-47, ISSN: 0277-0865 (XP008039475).
European Search Report issued by the European Patent Office on Dec. 6, 2010 in connection with European patent application No. 05773540.9-2413, which corresponds to related U.S. Patent No. 7,496,962.
Notice of Allowance issued by the U.S. Patent Office on Jan. 24, 2011 in connection with related U.S. Appl. No. 10/843,459.
Notice of Allowance issued by the U.S. Patent Office on Feb. 24, 2011 in connection with related U.S. Appl. No. 11/493,934.
U.S. Appl. No. 13/046,127, filed Mar. 11, 2011, Roesch.
U.S. Appl. No. 13/086,819, filed Apr. 14, 2011, Olney et al.
Press Release, "FaceTime Protects Enterprises from Information Leaks over Collaborative Suites like Microsoft OCS and IBM Sametime", issued by FaceTime Communications, Belmont, California, Jul. 14, 2008, retrieved from www.facetime.com/pr/pr080714.aspx, Dec. 1, 2009.
Office Action mailed Mar. 1, 2011 from the Japan Patent Office for Japanese patent application No. 2007-523640 in connection with related U.S. Appl. No. 10/898,220, now U.S. patent No. 7,539,681, U.S. Appl. No. 11/785,609, now U.S. patent No. 7,756,885, and U.S. Appl. No. 12/010,900 (English translation enclosed).
Office Action issued by the U.S. Patent Office on Apr. 6, 2011 in connection with related U.S. Appl. No. 11/711,876.
Office Action issued by the U.S. Patent Office on Apr. 13, 2011 in connection with related U.S. Appl. No. 12/230,338.
Office Action issued by the U.S. Patent Office on May 12, 2011 in connection with related U.S. Appl. No. 12/149,196.
Notice of Allowance issued by the U.S. Patent Office on Apr. 6, 2011 in connection with related U.S. Appl. No. 12/010,900.
PCT International Preliminary Report on Patentability mailed on Apr. 21, 2011 by the International Bureau of WIPO in connection with PCT patent application No. PCT/US2009/059965, which corresponds to U.S. Appl. No. 12/575,612.
U.S. Appl. No. 10/843,374, filed May 2004, Roesch et al., System and Methods for Determining Characteristics of a Network Based on Flow Analysis.
U.S. Appl. No. 10/843,398, filed May 2004, Roesch et al., Systems and Methods for Determining Characteristics of a Network.
U.S. Appl. No. 10/843,459, filed May 2004, Roesch et al., Systems and Methods for Determining Characteristics of a Network and Enforcing Policy.
U.S. Appl. No. 12/688,400, filed Jan. 2010, Vogel, III et al., Systems and Methods for Modifying Network Map Attributes.
U.S. Appl. No. 12/820,227, filed Jun. 2010, Vogel, III et al., System and Method for Resolving Operating System or Service Identity Conflicts.
Aho et al., "Efficient String Matching: An Aid to Bibliographic Search," *Communications from the ACM* (Jun. 1975), vol. 18, No. 6, pp. 333-340.
Tarjan, et al., "Storing a Sparse Table," Communications of the ACM (Nov. 1979), vol. 2, No. 11, pp. 606-620.
V. Jacobson, et al., Request for Comments: 1323, "TCP Extensions for High Performance," May 1992 (35 pages).
J. Howe, "An Environment for "Sniffing" DCE-RPC Traffic," *CITI Technical Report 93-4*, Jun. 21, 1993, 12 pages total.
T. Ptacek, et al., "Insertion, Evasion, and Denial of Service: Eluding Network Intrusion Detection", Jan. 1998, pp. 1-63.
R. Gula, "Passive Vulnerability Detection. *Techniques to passively find network security vulnerabilities*," Sep. 9, 1999 (5 pp.).

N. Chase, "Active Server pp. 3.0 from Scratch" (Dec. 1999), Searching for products section, 13 pp.
L. Spitzner, "Passive Fingerprinting," *FOCUS on Intrusion Detection: Passive Fingerprinting* (May 3, 2000), pp. 1-4; obtained from: http://www.stillhq.com/pdfdb/000183/data.pdf.
N. Brownlee, et al., "Methodology for Passive Analysis of a University Internet Link," *PAM 2001 Passive and Active Measurement Workshop*, Apr. 2001 (7 pp.).
B. Krishnamurthy, "Web Protocols and Practice," (May 1, 2001), pp. 518-520.
G. Lyon, "Remote OS detection via TCP/IP Stack Fingerprinting" (Jun. 30, 2002), pp. 1-12, obtained from: http://web.archive.org/web20021017063625/www.insecure.org/nmap/nmap-fingerprinting-article.html.
M. Norton, "Multi-Pattern Search Engine" source code, released Mar. 2003 (11 pages total).
U. Shankar and V. Paxson, *Active Mapping: Resisting NIDS Evasion Without Altering Traffic*, Proc. IEEE Symposium on Security and Privacy, May 2003, pp. 1-18.
D. Roelker, "HTTP IDS Evasions Revisited" (Aug. 1, 2003) [online] (retrieved on Nov. 9, 2006). Retrieved from the Internet <URL: http://docs.idsresearch.org/http_ids_evasions.pdf>.
R.P. Lippmann et al., "Passive Operating System Identification from TCP/IP Packet Headers," *Proceedings Workshop on Data Mining for Computer Security (DMSEC)*, Nov. 2003 (10 pp.).
Norton et al., "Multi-Patten Search Engine Aho-Corasick State Machine" (Mar. 17, 2004), Version 2.0, 36 pp.
R. Deraison, et al., "Passive Vulnerability Scanning: Introduction to NeVO," *Tenable Network Security*, May 30, 2004, pp. 1-13.
Full Band and Matrix Algorithms (Jun. 9, 2004), http://web.archive.org/web20040109154658/http://www.netlib.org/utk/lsi/pcwLSI/text/node150.html.
M. Norton, "Optimizing Pattern Matching for Intrusion Detection" (Jul. 4, 2004) [online] (retrieved on Nov. 9, 2006). Retrieved from the Internet <URL: http://docs.idsresearch.org/OptimizingPatternMatchingForIDS.pdf>.
R. Deraison, et al., "Nessus Network Auditing," *Sungress Publishing*, Jul. 20, 2004, pp. 1-13.
Norton et al., "Sourcefire Optimizing Pattern Matching for Intrusion Detection" (Sep. 2004), 14 pp.
J. Novak, "Target-Based Fragmentation Reassembly" (Apr. 2005), Revision 2.0, pp. 1-32.
S.Siddharth, "Evading NIDS, revisited" (Dec. 12, 2005).
"Snort™ Users Manual 2.6.0," *The Snort Project* (May 23, 2006), pp. 1-126.
"Toupper( )—convert lowercase character to uppercase," http://www.mkssoftware.com, printed on Sep. 20, 2008 from http://web.archive.org, archive date Jun. 30, 2006, 2 pp.
J. Novak et al., "Target-Based TCP Stream Reassembly" (Aug. 3, 2007), Revision 1.0, pp. 1-23, obtained from: http://www.snort/org/docs/stream5-model1AUg032007.pdf.
"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.
D. Joseph, et al., "A Policy-aware Switching Layer for Data Centers," *SIGCOMM*, Aug. 17-22, 2008, pp. 51-62.
"Enhanced Operating System Identification with Nessus," *Tenable Network Security (2007), obtained from: http://blog.tenablesecurity.com/2009/02/enhanced_operat.html*, posted by R. Gula on Feb. 16, 2009 (3 pp. total).
Office Action issued by the U.S. Patent Office on Jul. 16, 2007 in connection with related U.S. Appl. No. 10/898,220.
Office Action issued by the U.S. Patent Office on Sep. 6, 2007 in connection with related U.S. Appl. No. 10/843,374.
Notice of Allowance issued by the U.S. Patent Office on Sep. 6, 2007 in connection with related U.S. Appl. No. 10/843,376.
Office Action issued by the U.S. Patent Office on Sep. 26, 2007 in connection with related U.S. Appl. No. 10/843,353.
Office Action issued by the U.S. Patent Office on Oct. 4, 2007 in connection with related U.S. Appl. No. 10/951,796.
Notice of Allowance issued by the U.S. Patent Office on Oct. 5, 2007 in connection with related U.S. Appl. No. 10/793,887.
International Search Report and Written Opinion of the International Searching Authority issued on Oct. 9, 2007 in connection with PCT application No. PCT/US06/43800, which corresponds to U.S. Appl. No. 11/272,034.
Office Action issued by the U.S. Patent Office on Nov. 21, 2007 in connection with related U.S. Appl. No. 10/843,398.
European Search Report issued by the European Patent Office on Nov. 22, 2007 in connection with European patent application No. 07014575.0-1244, which corresponds to related U.S. Appl. No. 11/493,934.
International Search Report and Written Opinion of the International Searching Authority issued on Dec. 5, 2007 in connection with PCT application No. PCT/US05/25583, which corresponds to U.S. Appl. No. 10/951,796.
European Search Report issued by the European Patent Office on Dec. 27, 2007 in connection with European patent application No. 07015003.2-2413, which corresponds to related U.S. Appl. No. 11/501,776.
Office Action issued by the U.S. Patent Office on Jan. 10, 2008 in connection with related U.S. Appl. No. 10/843,373.
Office Action issued by the U.S. Patent Office on Feb. 5, 2008 in connection with related U.S. Appl. No. 10/843,375.
Office Action issued by the U.S. Patent Office on Feb. 21, 2008 in connection with related U.S. Appl. No. 11/272,033.
Office Action issued by the U.S. Patent Office on Mar. 12, 2008 in connection with related U.S. Appl. No. 10/843,459.
Office Action issued by the U.S. Patent Office on Mar. 20, 2008 in connection with related U.S. Appl. No. 10/843,374.
Final Office Action issued by the U.S. Patent Office on May 9, 2008 in connection with related U.S. Appl. No. 10/843,353.
International Preliminary Report on Patentability mailed on May 22, 2008 in connection with PCT application No. PCT/US06/43800, which corresponds to U.S. Appl. No. 11/272,034.
Final Office Action issued by the U.S. Patent Office on Jun. 4, 2008 in connection with related U.S. Appl. No. 10/843,398.
International Search Report and Written Opinion of the International Searching Authority issued on Jun. 19, 2008 in connection with PCT application No. PCT/US05/25584, which corresponds to U.S. Appl. No. 10/898,220.
Final Office Action issued by the U.S. Patent Office on Jun. 26, 2008 in connection with related U.S. Appl. No. 10/898,220.
International Search Report and Written Opinion of the International Searching Authority issued on Jun. 30, 2008 in connection with PCT application No. PCT/US07/21351, which corresponds to U.S. Appl. No. 11/905,980.
International Search Report and Written Opinion of the International Searching Authority issued on Jul. 2, 2008 in connection with PCT application No. PCT/US08/02454, which corresponds to U.S. Appl. No. 11/711,876.
International Search Report and Written Opinion of the International Searching Authority issued on Jul. 7, 2008 in connection with PCT application No. PCT/US06/43820, which corresponds to U.S. Appl. No. 11/272,035.
Office Action issued by the U.S. Patent Office on Jul. 11, 2008 in connection with related U.S. Appl. No. 11/272,034.
Final Office Action issued by the U.S. Patent Office on Jul. 17, 2008 in connection with related U.S. Appl. No. 10/843,459.
Final Office Action issued by the U.S. Patent Office on Aug. 6, 2008 in connection with related U.S. Appl. No. 10/843,375.
Notice of Allowance issued by the U.S. Patent Office on Aug. 18, 2008 in connection with related U.S. Appl. No. 11/272,033.
International Search Report and Written Opinion of the International Searching Authority issued on Aug. 18, 2008 in connection with PCT application No. PCT/US08/05466, which corresponds to U.S. Appl. No. 12/149,196.
Final Office Action issued by the U.S. Patent Office on Aug. 19, 2008 in connection with related U.S. Appl. No. 10/843,373.
Final Office Action issued by the U.S. Patent Office on Aug. 20, 2008 in connection with related U.S. Appl. No. 10/843,353.
Office Action issued by the U.S. Patent Office on Oct. 6, 2008 in connection with related U.S. Appl. No. 10/843,374.
Notice of Allowance issued by the U.S. Patent Office on Oct. 15, 2008 in connection with related U.S. Appl. No. 10/951,796.

Notice of Allowance issued by the U.S. Patent Office on Oct. 21, 2008 in connection with related U.S. Appl. No. 10/843,375.
European Office Action issued by the European Patent Office on Nov. 28, 2008 in connection with European patent application No. 07 015 003.2-2413, which corresponds to related U.S. Appl. No. 11/501,776.
Office Action issued by the U.S. Patent Office on Dec. 17, 2008 in connection with related U.S. Appl. No. 10/843,398.
Office Action issued by the U.S. Patent Office on Dec. 23, 2008 in connection with related U.S. Appl. No. 11/272,034.
Office Action issued by the U.S. Patent Office on Jan. 16, 2009 in connection with related U.S. Appl. No. 10/843,353.
Office Action issued by the U.S. Patent Office on Jan. 21, 2009 in connection with related U.S. Appl. No. 11/493,934.
Notice of Allowance issued by the U.S. Patent Office on Jan. 21, 2009 in connection with related U.S. Appl. No. 10/898,220.
Office Action issued by the U.S. Patent Office on Feb. 4, 2009 in connection with related U.S. Appl. No. 10/843,373.
Office Action issued by the U.S. Patent Office on Feb. 9, 2009 in connection with related U.S. Appl. No. 10/843,459.
International Preliminary Report on Patentability and Written Opinion of the International Searching Authority mailed on Mar. 3, 2009 in connection with PCT application No. PCT/US05/025584, which corresponds to U.S. Appl. No. 10/898,220.
International Preliminary Report on Patentability and Written Opinion of the International Searching Authority mailed on Mar. 17, 2009 in connection with corresponding PCT application No. PCT/US06/43820, which corresponds to related U.S. Appl. No. 11/272,035.
International Preliminary Report on Patentability mailed on Apr. 7, 2009 in connection with PCT application No. PCT/US07/021351, which corresponds to U.S. Appl. No. 11/905,980.
Office Action issued by the U.S. Patent Office on Apr. 28, 2009 in connection with related U.S. Appl. No. 11/501,776.
Final Office Action issued by the U.S. Patent Office on May 13, 2009 in connection with related U.S. Appl. No. 10/843,374.
Office Action issued by the U.S. Patent Office on May 14, 2009 in connection with related U.S. Appl. No. 11/272,034.
International Search Report and Written Opinion of the International Searching Authority mailed on May 27, 2009 in connection with PCT application No. PCT/US09/02210, which corresponds to U.S. Appl. No. 12/230,338.
Office Action issued by the U.S. Patent Office on Jun. 1, 2009 in connection with related U.S. Appl. No. 11/272,035.
Notice of Allowance issued by the U.S. Patent Office on Jun. 11, 2009 in connection with related U.S. Appl. No. 10/843,373.
Office Action issued by the U.S. Patent Office on Jun. 23, 2009 in connection with related U.S. Appl. No. 11/785,609.
Office Action issued by the U.S. Patent Office on Jul. 6, 2009 in connection with related U.S. Appl. No. 10/843,459.
Office Action issued by the U.S. Patent Office on Jul. 7, 2009 in connection with related U.S. Appl. No. 10/843,398.
Office Action issued by the U.S. Patent Office on Jul. 28, 2009 in connection with related U.S. Appl. No. 10/843,353.
Office Action issued by the U.S. Patent Office on Jul. 30, 2009 in connection with related U.S. Appl. No. 11/493,934.
Office Action issued by the U.S. Patent Office on Aug. 20, 2009 in connection with related U.S. Appl. No. 10/843,374.
International Preliminary Report on Patentability mailed on Sep. 11, 2009 in connection with PCT application No. PCT/US08/002454, which corresponds to U.S. Appl. No. 11/711,876.
Advisory Action issued by the U.S. Patent Office on Sep. 29, 2009 in connection with related U.S. Appl. No. 10/843,459.
European Search Report issued by the European Patent Office on Oct. 12, 2009 in connection with European patent application No. 05773501.1-2201, which corresponds to related U.S. Appl. Nos. 10/898,220, 11/785,609 and 12/010,900.
Final Office Action issued by the U.S. Patent Office on Oct. 29, 2009 in connection with related U.S. Appl. No. 11/501,776.
International Preliminary Report on Patentability mailed on Nov. 12, 2009 in connection with PCT application No. PCT/US08/005466, which corresponds to U.S. Appl. No. 12/149,196.
Advisory Action issued by the U.S. Patent Office on Dec. 2, 2009 in connection with related U.S. Appl. No. 10/843,398.
Notice of Allowance issued by the U.S. Patent Office on Dec. 8, 2009 in connection with related U.S. Appl. No. 11/501,776.
Final Office Action issued by the U.S. Patent Office on Dec. 8, 2009 in connection with related U.S. Appl. No. 11/272,034.
Final Office Action issued by the U.S. Patent Office on Dec. 9, 2009 in connection with related U.S. Appl. No. 11/272,035.
Office Action issued by the U.S. Patent Office on Dec. 17, 2009 in connection with related U.S. Appl. No. 11/493,934.
Notice of Allowance issued by the U.S. Patent Office on Jan. 7, 2010 in connection with related U.S. Appl. No. 10/843,353.
Notice of Allowance issued by the U.S. Patent Office on Jan. 8, 2010 in connection with related U.S. Appl. No. 10/843,373.
Office Action issued by the European Patent Office on Jan. 15, 2010 in connection with European patent application No. 05773501.1-2201, which corresponds to related U.S. Appl. Nos. 10/898,220, 11/785,609 and 12/010,900.
Notice of Allowance issued by the U.S. Patent Office on Feb. 5, 2010 in connection with related U.S. Appl. No. 11/272,034.
Advisory Action issued by the U.S. Patent Office on Feb. 24, 2010 in connection with related U.S. Appl. No. 11/272,035.
Notice of Allowance issued by the U.S. Patent Office on Mar. 5, 2010 in connection with related U.S. Appl. No. 11/785,609.
International Search Report and Written Opinion of the International Searching Authority issued on Mar. 16, 2010 in connection with PCT application No. PCT/US09/59965, which corresponds to U.S. Appl. No. 12/575,612.
Office Action issued by the U.S. Patent Office on Mar. 16, 2010 in connection with related U.S. Appl. No. 11/272,035.
Final Office Action issued by the U.S. Patent Office on Mar. 17, 2010 in connection with related U.S. Appl. No. 10/843,374.
Office Action issued by the U.S. Patent Office on Mar. 22, 2010 in connection with related U.S. Appl. No. 11/493,934.
Office Action issued by the U.S. Patent Office on Apr. 7, 2010 in connection with related U.S. Appl. No. 11/711,876.
Office Action issued by the U.S. Patent Office on Apr. 15, 2010 in connection with related U.S. Appl. No. 12/010,900.
Office Action issued by the U.S. Patent Office on Apr. 21, 2010 in connection with related U.S. Appl. No. 10/843,459.
Notice of Allowance issued by the U.S. Patent Office on May 24, 2010 in connection with related U.S. Appl. No. 10/843,398.
Office Action issued by the U.S. Patent Office on May 31, 2011 in connection with related U.S. Appl. No. 12/688,400.
Notice of Allowance issued by the U.S. Patent Office on Jun. 22, 2011 in connection with related U.S. Appl. No. 11/272,035.
Notice of Allowance issued by the U.S. Patent Office on Jul. 22, 2011 in connection with related U.S. Appl. No. 11/711,876.
Extended European Search Report issued by the European Patent Office on Jul. 19, 2011 in connection with European patent application No. 06837333.1-2413, which corresponds to related U.S. Patent No. 7,733,803.
International Search Report and Written Opinion of the International Searching Authority issued on Jul. 28, 2011 in connection with PCT application No. PCT/US2011/032489, which corresponds to U.S. Appl. No. 13/086,819.
Matthew Olney et al.: "What would you do with a pointer and a size? A New Detection Framework", Apr. 22, 2010 (Apr. 2, 2010), XP55002567, http://labs.snort.org/nrt/sfvrt-nrt.pdf (retrieved on Jul. 12, 2011) the whole document.
R. Hiyoshi, "Practical Guide to Intrusion Detection System: Snort & Tripwire," Japan, Apr. 25, 2004, pp. 57-230 (concise English explanation of relevance attached).
Advisory Action issued by the U.S. Patent Office on Aug. 3, 2010 in connection with related U.S. Appl. No. 10/843,374.
Final Office Action issued by the U.S. Patent Office on Sep. 8, 2010 in connection with related U.S. Appl. No. 10/843,459.
Final Office Action issued by the U.S. Patent Office on Sep. 17, 2010 in connection with related U.S. Appl. No. 11/711,876.
Office Action mailed Sep. 7, 2010 from the Japan Patent Office for Japanese patent application No. 2007-523639 in connection with related U.S. Appl. No. 10/951,796, now U.S. patent No. 7,496,962 (English translation enclosed).
Final Office Action issued by the U.S. Patent Office on Sep. 30, 2010 in connection with related U.S. Appl. No. 11/493,934.

Final Office Action issued by the U.S. Patent Office on Dec. 9, 2011 in connection with related U.S. Appl. No. 12/688,400.
Office Action issued by the U.S. Patent Office on Feb. 2, 2012 in connection with related U.S. Appl. No. 12/688,400.
Office Action issued by the U.S. Patent Office on Feb. 15, 2012 in connection with related U.S. Appl. No. 12/820,227.
Office Action issued by the U.S. Patent Office on Feb. 15, 2012 in connection with related U.S. Appl. No. 12/230,338.
Office Action issued by the U.S. Patent Office on Mar. 5, 2012 in connection with related U.S. Appl. No. 12/968,682.
Notice of Allowance issued by the U.S. Patent Office on Jun. 25, 2012 in connection with related U.S. Appl. No. 12/688,400.
Office Action issued by the U.S. Patent Office on Oct. 15, 2012 in connection with related U.S. Appl. No. 12/230,338.
International Preliminary Report on Patentability mailed by the International Bureau of WIPO on Oct. 26, 2012, in connection with corresponding PCT application No. PCT/US2011/032489, which corresponds to related U.S. Appl. No. 13/086,819.
Office Action issued by the U.S. Patent Office on Nov. 6, 2012 in connection with related U.S. Appl. No. 12/820,227.
Li, Zhichun, et al. Netshield: Matching with a large vulnerability signature ruleset for high performance network defense. Technical Report NWU-EECS-08-07, Northwestern University, Aug. 2010.
Office Action issued by the U.S. Patent Office on Jan. 10, 2013 in connection with related U.S. Appl. No. 12/969,682.
International Search Report and Written Opinion of the International Searching Authority issued on Apr. 25, 2012 in connection with PCT application No. PCT/US2012/021633, which corresponds to U.S. Appl. No. 13/046,127.
Final Office Action issued by the U.S. Patent Office on May 29, 2012 in connection with related U.S. Appl. No. 12/230,338.
Notice of Allowance issued by the U.S. Patent Office on May 30, 2012 in connection with related U.S. Appl. No. 12/575,612.

* cited by examiner

SYSTEM AND METHOD FOR ASSIGNING NETWORK BLOCKS TO SENSORS

TECHNICAL FIELD

The technical field relates in general to communication network monitoring, and more specifically to configuring network sensors used on the communication network.

BACKGROUND

Currently, a company can have a network with numerous computers on it, all within multiple networks. The computer system that monitors the company's networks has sensors attached to some of their networks to detect the devices, operating systems, and the like on the networks. However, the sensors are not necessarily one per network. Furthermore, it is not necessarily apparent which one sensor is physically closest to which network.

In order to obtain a reliably accurate representation of the systems on a particular network and what the systems are doing (such as the servers and clients they are running and who they are connecting to), a user needs the information from the sensor which is closest to that network because the closest sensor has the best view of that network.

Currently, users manually specify which sensor is assigned to which network based on their own understanding of their network's topology and where their sensors are located.

SUMMARY

Accordingly, one or more embodiments of the present invention provide methods, systems, and/or computer readable memory mediums. The computer system can include a processor device. Embodiments can detect a physical topology of a network comprising hosts and sensors in the network. Also, embodiments can generate a sensor policy for assignment of the sensors to network blocks of the hosts, that balances a processing load and accuracy of the sensors in the network based on physical closeness of the sensors to different divisions of hosts within a same network block.

Another embodiment can score a distance between each sensor and hosts within divisions of the same network block.

Still a further embodiment comprises scaling the scoring to increasingly prefer a larger network block as the divisions of hosts within the network block are iteratively smaller.

In still other embodiments, a sensor most suited to the network block is determined by recursively determining sensors with best physical proximity scores for smaller and smaller divisions of the network block Another embodiment includes transmitting the sensor policy to the sensors in the network to instruct the sensors as to which hosts to monitor.

Still another embodiment includes displaying the sensor policy for assignment of the sensor, on a display to a user for acceptance of the sensor policy.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

Figure 1:
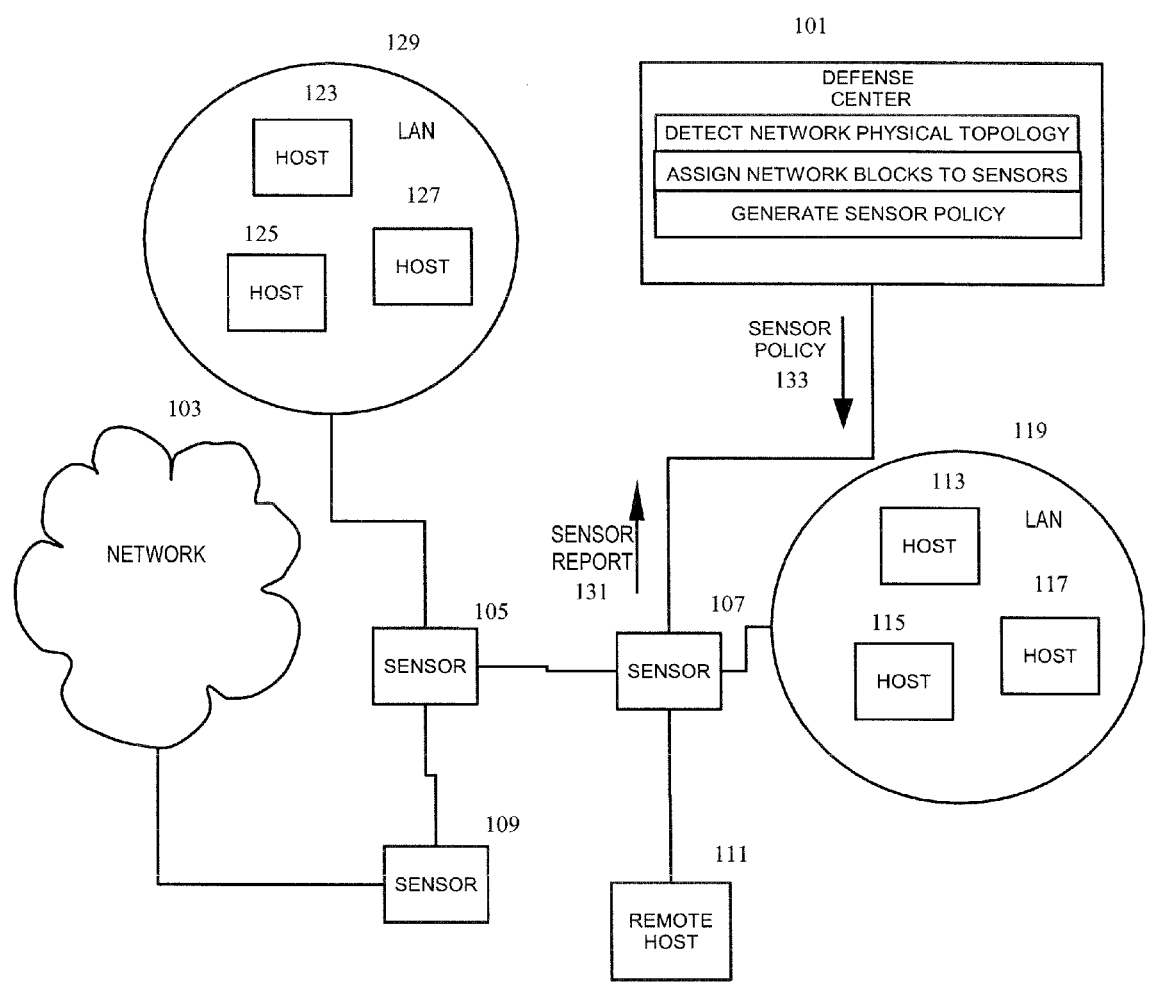
FIG. 1 is a diagram illustrating a simplified and representative environment associated with assigning network blocks to sensors.

In overview, the present disclosure concerns monitoring of communication networks, often referred to as packet switching networks, which support communication between a source and a destination. Packets on such communication networks may carry information which suggests a physical topology of the network. Such packets can be read when they are in transit between source and destination by sensors that collect the information and report the collected information to a central computer system for further use. More particularly, various inventive concepts and principles are embodied in systems, devices, and methods therein for proposing an assignment of sensors to monitor network blocks within the network, so as to balance a processing load while improving accuracy.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Relational terms such as first and second, and the like, if any, are used herein solely to distinguish one from another entity, item, or action without necessarily requiring or implying any actual such relationship or order between such entities, items or actions. Some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Further in accordance with exemplary embodiments, a central defense controller can take a list of the top-level networks that the user wishes to monitor, can automatically subdivide those networks and can assign the various subdivided networks to the sensors that can best monitor that traffic due to physical proximity. That is, the network can be measured in relation to the sensors. More particularly, the network can be divided up into blocks, and then for each of those blocks, the controller can determine which sensor is closest to that block and use that sensor. However, the way that the networks are divided up can take into consideration efficiency and user-friendliness. For example, if 90% of the hosts in the network are better covered by sensor A and a couple of hosts are better covered by sensor B, all of the hosts can be assigned to sensor A because it more efficient and more user-friendly for people to be able to read and understand what is going on.

Referring now to FIG. 1, a diagram illustrating a simplified and representative environment associated with assigning network blocks to sensors will be discussed and described. FIG. 1 illustrates a Defense Center 101, which is representative of a central defense controller (sometimes referred to herein as a "central computer system"), networks 119, 129, 103, 111 (which are representative of any number of networks), and sensors 105, 107, 109, 111 (which are representative of any number of sensors). Together, these can comprise a network which is monitored by the sensors and reported to the central defense controller.

In this illustration, the networks are LAN 119, 129, intranet network 103, and a remote host 111 which for the purposes of this document is considered a "network" albeit comprising a single remote host. The LAN 129 and LAN 119 include hosts 113, 115, 117, 123, 125, 127 (which are representative of any number of hosts included in the LAN). The intranet network 103 can include any number of hosts. One or more sensors 105, 107, 109, 111 can be placed between the networks 103, 111, 119, 129 and the Defense Center 101, as will be understood by one of skill in this art.

The Defense Center 101 can transmit a sensor policy 133 to the sensors 105, 107, 109, 111 according to known techniques, and the sensors receive the sensor policy 133. The sensor policy specifies, among other things, which network(s) a sensor is to monitor. The sensors 105, 107, 109, 111 can observe packets being transmitted on the network between hosts. The sensors 105, 107, 109, 111 individually send a sensor report 131 to the Defense Center 101 which reports on, among other things, contents of packets which the sensor has observed being transmitted, according to known conventions.

The sensors 105, 107, 109, 111 on the network can use information which they observe in packets, for example, TTL information, to determine their physical distance from the hosts that they can see traffic to and from. The packet information can be collected and analyzed and can be used to create a list of active network blocks. An active network block can then be monitored by the sensor to which it is assigned, typically by the sensor policy 133. The sensor that is assigned to monitor an active network block can be physically closest to the network block and can see the most hosts relative to other sensors.

A conventional sensor just gathers the information and sends it out, for example to a central defense controller which collects the information from the sensors.

The central computer system, e.g., the Defense Center 101, can measure physical proximity of the sensors 105, 107, 109, 111 to groupings of hosts, can determine which ones of the sensors have the best combination of monitoring the most hosts in a network block while being closest to the hosts in the network block, so that the combination of sensors assigned to network blocks can achieve a best balance of processing load and accuracy, as further explained. The Defense Center 101 can divide the network into blocks of hosts (using a netmask), and then assign sensors to the different network blocks. A given network block contains a certain number of hosts on the network. For each of the sensors 105, 107, 109, 111, the central computer system 101 can determine the distance between different hosts in the network block and the sensor, and assign a score based on the distance between the host and sensor. Then, this can be repeated for all of the hosts in that block vs. all of the sensors in the network. Then, it can be determined which sensor has the best score. The sensor with the best score is best suited to monitor the network block because that sensor is the one that can monitor the most hosts in the network block and is closest to them. Consequently, that sensor should have the best information about the hosts in that network block.

The central defense controller, such as the Defense Center available from Sourcefire, or a similar arrangement, is an appropriate central computer system 101 for implementation of embodiments discussed herein.

When the central computer system 101 looks at a larger network block, the sensor with the best score for that block can be determined, and then the block can be divided up into the next size smaller blocks each having individual sensors and determining scores for each of the smaller blocks. A comparison can be done recursively to determine which has sensor/network block combination the highest overall score. A slight preference can be given to having larger network blocks to avoid recursively degenerating into assigning every host to be monitored individually by a sensor.

The subdivision into network blocks can be performed dynamically as follows. For example, consider that a score for sensor A is 100. If the network block is divided in half, to be monitored half by sensor A and half by B, it would sum to 110. That suggests that using both sensors A and B is better. In the non-dynamic embodiment, the sum of the scores of the smaller networks can be multiplied by a threshold, e.g., 95% (in order to slightly prefer larger networks). (In this example, 95% of 110 is better than 100, so use of both sensors A and B is proposed.) In the dynamic embodiment, the system can look at how many networks blocks are generated overall; as the number of network blocks grows, the preference threshold grows smaller (which prefers a better granularity for a user's understanding). Two hundred network blocks, for example, is inefficient for users to read and comprehend because it is too many. The inventors have noticed, to keep things at a reasonable value, an initial scaling factor can start at 95%, and can decrease as low as 80%. Below 80% threshold seems to incur loose/arbitrary/inaccurate results. Having no more than 7 recommendations per sensor seems to be user-friendly; thus if there are five sensors, thirty-five network blocks is user-friendly.

Physical topology detection can use any known technique, of which there are numerous known methodologies. Using hops indicated in a packet to see what is close is an example of a traditional technique. Physical network topology changes constantly in most systems, such as when remote hosts are added or moved. Changes in the physical topology of the network can be detected. If the locations change where the computers are connected, the sensors can detect where the computers are, and report that to the central computer system. Consequently, it is useful to reevaluate physical topology periodically and generate new recommendations for assignments of sensors to network blocks in response to either user interaction or automatically. As time passes, a user can get a recommendation that a network that was monitored by a first sensor is now better monitored by a different sensor which is now closer to that network. The assignments of sensors to network blocks can be reflected in a new or revised sensor policy 133 which can be transmitted to the sensors 105, 107, 109, 111.

The central computer system, e.g., the Defense Center 101, can generate sensor policy recommendations on a periodic basis and/or upon request. For example, the generation of sensor policy recommendations can be scheduled to re-evaluate the physical topology and assignment of sensors to network blocks, e.g., periodically, e.g., each day or each week.

Some current sensor policies require that each subnet of the network that the user wishes to monitor have a single sensor assigned to it. One sensor may be the reporting sensor for any number of subnets, however this sensor generates Primary host information for that subnet. Traffic between this subnet and another may be observed by the sensor for that other subnet. It will generate much more limited Secondary host information. If a particular subnet does not have a sensor directly attached to it, the reporting sensor should be the sensor that has the best view of traffic going into and out of that subnet. Other sensors may be able to see different traffic, however, with no one sensor having a complete view of the subnet.

Thus, information that sensor already passively gather can help the user determine the optimal subnet assignments for the sensors on the network, which subnets have sensors directly connected to them and also which sensors have the best views into additional subnets that the user indicates interest in.

1. The user does not accurately know which sensors are closest to which subnets: (A) Each sensor monitors those networks closest to it. (B) The user can verify/modify the assignments before applying the policy.

2. The users desire some semi-automated policy tuning: (A) At regular intervals, the central computer system can generate recommended subnet assignments and offer them for review. (B) At some point the user may elect to fully automate the process.

3. The user wishes to be protected against topology changes: (A) Notify the user with new recommendations.

4. Display the distance from a host to various sensors in the network: (A) Show closest sensor. (B) Show other sensors with how many hops further away they are.

5. In this example, a user has initially set up sensor A to watch 10.4.2.0/24. Both sensors A and B have equally good access to this network.
Current:
10.4.2.0/24→A
Recommended:
10.4.2.0/24→A—or—10.4.2.0/24→B 6. In this example, a user has set up sensor A to watch subnet 10.4.0.0/16. However, sensor B can see this network better.
Current:
10.4.0.0/16→A
Recommended:
10.4.0.0/16→B 7. In this example, a user has set up sensor A to watch subnet 10.4.0.0/16. However, other sensors can observe various portions of this network more effectively, and some portions of the network have no observed traffic.
Current:
10.4.0.0/16→A
Recommended:
10.4.1.0/24→B
10.4.2.0/24→C
10.4.3.0/24→D
10.4.0.0/16→Autodetect 8. In this example, a user has set up sensor A to watch 10.4.2.0/24 and sensor B to watch 10.4.3.0/24, and no other sensors to watch 10.4.x.x networks, but the user did initially configure all of 10.4.0.0/16 to be watched. Sensor A has better access to both of these networks.
Current:
10.4.2.0/24→A
10.4.3.0/24→B
10.4.0.0/16→Autodetect
Recommended:
10.4.0.0/16→A 9. In this example, a user has set up sensor A to watch 10.4.0.0/16, except 10.4.12.12 and sensor B to watch only 10.4.12.12. Both A and B are equidistant from the 10.4.0.0/16.
Current:
10.4.0.0/16→A
Exclude: 10.4.12.12/32→A
10.4.12.12/32→B
Recommended:
10.4.0.0/16→A—or—10.4.0.0/16→B
Remove (Exclude: 10.4.12.12/32→A)
Remove (10.4.12.12/32→B)

Figure 2:
FIG. 2 is a user interface illustrating a first aspect of assigning network blocks to sensors.

10. In this example, a user has set the network 10.4.0.0/16 to be autodetected. Traffic is only seen on 10.4.1.0/24 by sensor A and on 10.4.34.0/24 by sensor B.
Current:
10.4.0.0/16→Autodetect
Recommended:
10.4.1.0/24→A
10.4.34.0/24→B
10.4.0.0/16→Autodetect Referring now to FIG. 2 a user interface illustrating a first aspect of assigning network blocks to sensors will be discussed and described. A user interface 201 can include a list of networks to monitor. The list can include IP Address, netmask, type of data collection (e.g., host and/or flow data), and the sensor assigned thereto (a so-called "reporting detection engine").

The illustrated user interface 201 can interact with a user to bring up a display of recommendations for a sensor policy. In this illustration, a link labeled "Detection Engine Auto-detection" can bring up an overlay containing recommendations for the policy. Also, in the illustrated user interface 201, a row that is affected by a recommendation can include an indication such as an icon to bring up the recommendation(s).

Figure 3:
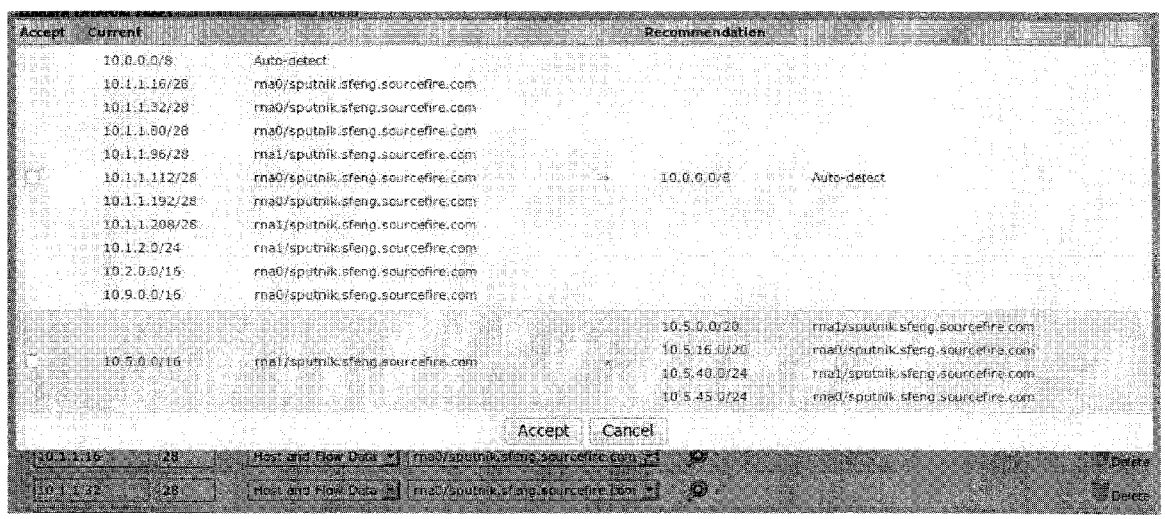
FIG. 3 is a user interface illustrating a second aspect of assigning network blocks to sensors.

Referring now to FIG. 3, a user interface 301 illustrating a second aspect of assigning network blocks to sensors will be discussed and described. The user interface 301 can display an overlay listing all recommendations. The illustrated recommendations overlay has three columns: a checkbox to indicate if the recommendation has been accepted or not, the current network/sensor assignments, and the recommendation network/sensor assignments that the system recommends to replace the current assignments. The illustrated user interface has two buttons: "Accept", which accepts the checked recommendations and replaces the original assignments with the new ones and "Cancel" which returns to the original view, changing nothing.

In this example, a first current assignment is 10.0.0.0/8 to Auto-detect, 10.1.1.16/28 to rna0/sputnik.sfeng.sourcefire.com; 10.1.1.32/28 to rna0/sputnik.sfeng.sourcefire.com; 10.1.1.80/28 to rna0/sputnik.sfeng.sourcefire.com; 10.1.1.96/28 to rna2/sputnik.sfeng.sourcefire.com; 10.1.1.112/28 to rna0/sputnik.sfeng.sourcefire.com; 10.1.1.192/28 to ma1/sputnik.sfeng.sourcefire.com; 10.1.1.208/28 to rna1/sputnik.sfeng.sourcefire.com; 10.1.2.0/24 to rna1/sputnik.sfeng.sourcefire.com; 10.2.0.0/16 to rna0/sputnik.sfeng.sourcefire.com; and 10.9.0.0/16 to rna0/sputnik.sfeng.sourcefire.com. The recommendation is to replace the first current assignment with 10.0.0.0/8 assigned to Auto-detect. Also, in this example a second current assignment is 10.5.0.0/16 to rna1/sputnik.sfeng.sourcefire.com. The recommendation is to replace the second current assignment with 10.5.0.0/20 to ma1/sputnik.sfeng.sourcefire.com; 10.5.16.0/20 to rna0/sputnik.sfeng.sourcefire.com; 10.5.40.0.24 to rna1/sputnik.sfeng.sourcefire.com; and 10.5.45.0/24 to rna0/sputnik.sfeng.sourcefire.com.

This user interface sets which sensor monitors which network. The sensor policy creation screen can allow the user to choose to autodetect a sensor assignment. This can be presented as an option in the reporting DE dropdown.

Figure 4:
FIG. 4 is a user interface illustrating a third aspect of assigning network blocks to sensors.

Referring now to FIG. 4, a user interface 401 illustrating a third aspect of assigning network blocks to sensors will be discussed and described. Here, the user interface 401 allows for collapsing multiple subnets to one. As with FIG. 3, the left-hand column indicates the current assignment of subnets to sensors, and the right hand column is the recommendation. In this example, multiple subnets are collapsed into one.

Figure 5:
FIG. 5 is a user interface illustrating a fourth aspect of assigning network blocks to sensors.

Referring now to FIG. 5, a user interface 501 illustrating a fourth aspect of assigning network blocks to sensors will be discussed and described. Here, the user interface 501 allows for expanding a subnet from assignment to a single sensor to multiple sensors. As with FIG. 3, the left-hand column indicates the current assignment of subnets to sensors, and the right hand column is the recommendation. In this example, a single subnet is expanded into multiple subnets.

Figure 6:
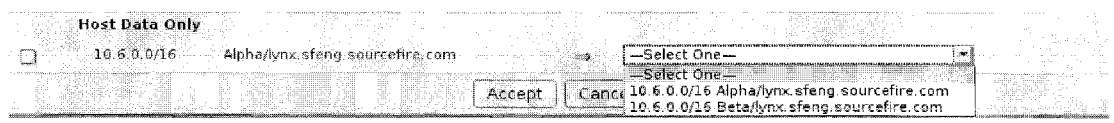
FIG. 6 is a user interface illustrating a fifth aspect of assigning network blocks to sensors.

Referring now to FIG. 6, a user interface 601 illustrating a fifth aspect of assigning network blocks to sensors will be discussed and described. In this example, two sensors have been determined to be equally good recommendations. A menu 601 such as the illustrated drop down can be used to interact with the user to determine which one of two equally good recommendations is preferred. The preference can be remembered so that if the same tied recommendation is generated again it will be in a list of ignored recommendations and not shown by default.

In a variation, the system can be programmed so that the sensor/network "recommendation" can be automatically accepted.

All of the different divisions of network blocks in combination with the different sensors can be generated. The following is an explanation of an example scoring algorithm that can be used to generate the assignments of networks to sensors. It can be run in two independent passes to generate assignments for Host and Flow networks and/or Host Only networks.

1. Extract the list of networks from the policy object.
2. Get the IP/MAC/TTL information for each host that each DE has seen.
3. Generate scores for network assignments:
   a. For each DE:
      i. Iterate through the list of hosts:
         1. Iterate the list of netmask lengths (0, 4, 8, 16, 20, 24, and 28):
            a. Combine the host and netmask to generate a network block. This ensures that all possible network blocks that contain at least one host are evaluated. If this block has already been evaluated or falls outside of the list of network blocks in the policy, go to the next netmask.
            b. Increment the counter for the number of hosts that DE can see in that network.
            c. Add points to the DE assignment score equal to 1/(1+distance from DE).
4. Recursively find the combination of non-overlapping network blocks where the scores sum to the maximum value.

A policy object is a policy specifying the networks that are to be monitored. The policy is typically user-defined. A policy object is a known technology in network management systems.

In the list of netmask lengths, the netmask length corresponds to the different sizes of networks, as is known. A netmask length indicates how big the network is, i.e., how many hosts it has; e.g. a /24 network includes 255 hosts, etc. It is possible that a single /16 network may be better off as four /24 networks.

The number of hosts in the network block can be counted, from the list of hosts which have been observed by the sensors. Then, using netmasks, the system can determine which host belongs in which network block.

The scoring discussed herein can use an inverse of the distance, because closer is better. Zero is the ideal score for distance. Even if a sensor can see a lot of hosts, if it is really far away it has a higher score which reflects that it is less accurate.

The following is a simple example of scoring. Consider a network with ten hosts, sensor A and sensor B. Sensor A is one hop away from the network but can see all of the hosts. Sensor A has score of 5 because each host is worth 0.5 point and it can see all ten hosts. Sensor B has only seen seven of those hosts, but it is 0 hops away (on the same network). Sensor B has score of 7 because each host is worth 1. In this example, sensor B will be preferred. Sensor B is closer and will be able to get more detailed information. It should in time be able to see those other hosts.

Memory swapping can be used to enable the scoring where the generated combinations cannot reasonably be maintained in memory, for example, when there are thousands of hosts. Consider the following example of memory swapping and memory consumption. In an embodiment, the /8 network is used as the biggest network. Everything that is /8 and smaller can be evaluated; only the hosts for a single /8 network are in memory at one time. As the system looks at each /8 network, the system generates partial numbers for /4 network subdivisions and /0 network subdivisions. Then, the numbers for the overall scoring are summed. The scaling is then done per /8 network set of hosts. The /8 network set of hosts can be maintained in memory for potential reevaluation.

Figure 7:
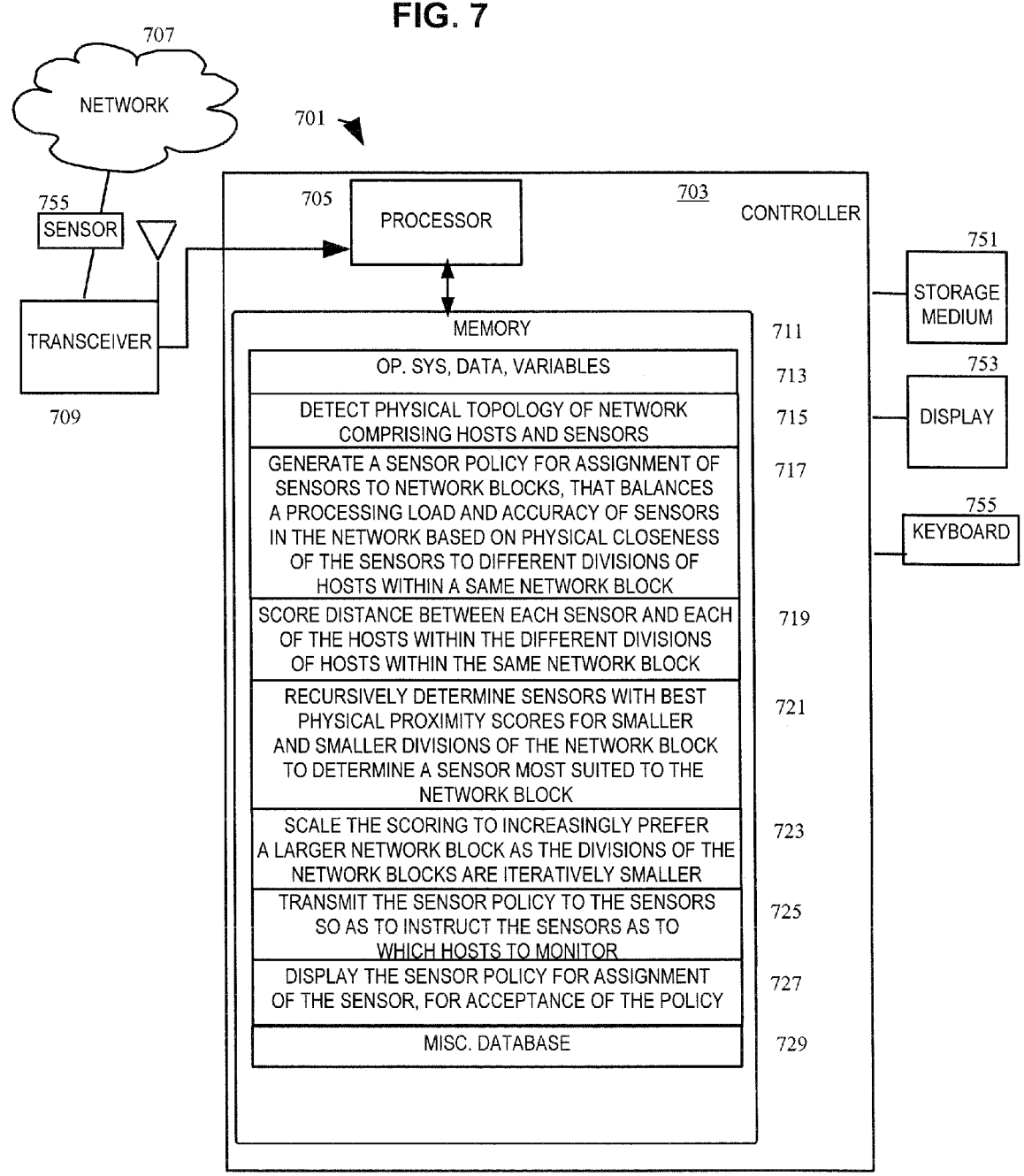
FIG. 7 is a block diagram illustrating portions of an exemplary computer system.

Referring now to FIG. 7, a block diagram illustrating portions of an exemplary computer system will be discussed and described. The computer system 701, sometimes referred to herein as a "system," may include one or more controllers 703, which can receive signals from a sensor 757 which senses communications from a network 707 in accordance with known techniques, where the communications are being sent to a target (not illustrated). The sensor 757 is representative of one or more sensors which can be deployed in accordance with known techniques. The controller 704 can include a processor 705 (sometimes referred to herein as a "processor device"), a memory 711, an optional display 753, and/or an optional user input device such as a keyboard 755. Additional remote or local storage can be provided on a storage medium 751.

The processor 705 may comprise one or more microprocessors and/or one or more digital signal processors. The memory 711 may be coupled to the processor 705 and may comprise a read-only memory (ROM), a random-access memory (RAM), a programmable ROM (PROM), and/or an electrically erasable read-only memory (EEPROM). The memory 711 may include multiple memory locations for storing, among other things, an operating system, data and variables 713 for programs executed by the processor 705; computer programs for causing the processor to operate in connection with various functions such as to detect 715 the physical topology of the network; generate 717 a sensor policy for assignment of sensors to network blocks; score 719 a distance between sensors and hosts; recursively determine 721 the sensors with the best scores for smaller and smaller divisions of the network block; scale 723 the scoring; transmit 725 the sensor policy to the sensors; display 727 the sensor policy; and a database 729 for other information used by the processor 705. Additional discussion about the computer programs follows. The computer programs may be stored, for example, in ROM or PROM and may direct the processor 705 in controlling the operation of the computer system 701. Much of the interconnection and relationship between the memory 711, the processor 705, the sensor 757, the network 707, the display 753, the keyboard 755, and the storage medium 751 is technology known to one of the skill in the art and will not be discussed herein.

The processor 705 may be programmed to detect 715 the physical topology of the network comprising hosts and sensors. In the illustrated example, packets are detected by the sensor 757 connected to the computer system 701 and information in the detected packets are supplied to the computer system 701 in accordance with known techniques. Various techniques can be used to passively read data at the sensor while the data is in motion on the network, for example, packet sniffing. Various known sensor devices can be programmed or otherwise configured to operate as the sniffer discussed herein. The sensor 757 can be electrically or wirelessly connected to the processor 705 so as to be in communication therewith, in accordance with conventional techniques. The sensor 757 and processor 705 which are connected together can mutually communicate with each other.

The processor 705 can be programmed to generate 717 a sensor policy for assignment of sensors to network blocks, that balances a processing load and accuracy of the sensors in the network based on the physical closeness of the sensors to different divisions of hosts within a same network block. Various examples and techniques for generating such a sensor policy have been discussed in detail above.

The processor 705 can be programmed to score 719 a distance between each sensor and each of the hosts within the different divisions of hosts within the same network block. Various examples and techniques for such scoring have been discussed in detail above.

The processor 705 can be programmed to recursively determine 721 the sensors with the best physical proximity scores for smaller and smaller divisions of the network block to determine a sensor most suited to the network block. Also, the processor 705 can be programmed to scale 723 the scoring to increasingly prefer a larger network block over its smaller network blocks as the divisions of the network blocks are iteratively smaller. Various examples and techniques for recursively determining the scores and for scaling the scoring have been discussed in detail above.

The processor 705 can be programmed to transmit 725 the sensor policy to the sensors, so as to instruct the sensors as to which hosts to monitor. The sensor policy can be developed as discussed herein, and then stored in the same form as a conventional sensor policy which includes an assignment of sensors to network blocks. Conventional techniques may be used to transmit the sensor policy.

The processor 705 can be programmed to display 727 the sensor policy and recommends for assignment of the sensor(s) to network blocks, and to interact with the user via the display 753 so as to accept or rejection the recommended sensor/network block assignments in the sensor policy. Examples of displays are provided above, although numerous variants and evolutions thereof are possible.

It should be understood that various logical groupings of functions are described herein. Different realizations may omit one or more of these logical groupings. Likewise, in various realizations, functions may be grouped differently, combined, or augmented. Furthermore, functions including those identified as optional can be omitted from various realizations. Similarly, the present description may describe or suggest a database or collection of data and information. One or more embodiments can provide that the database or collection of data and information can be distributed, combined, or augmented, or provided locally (as illustrated) and/or remotely (not illustrated).

Figure 8:
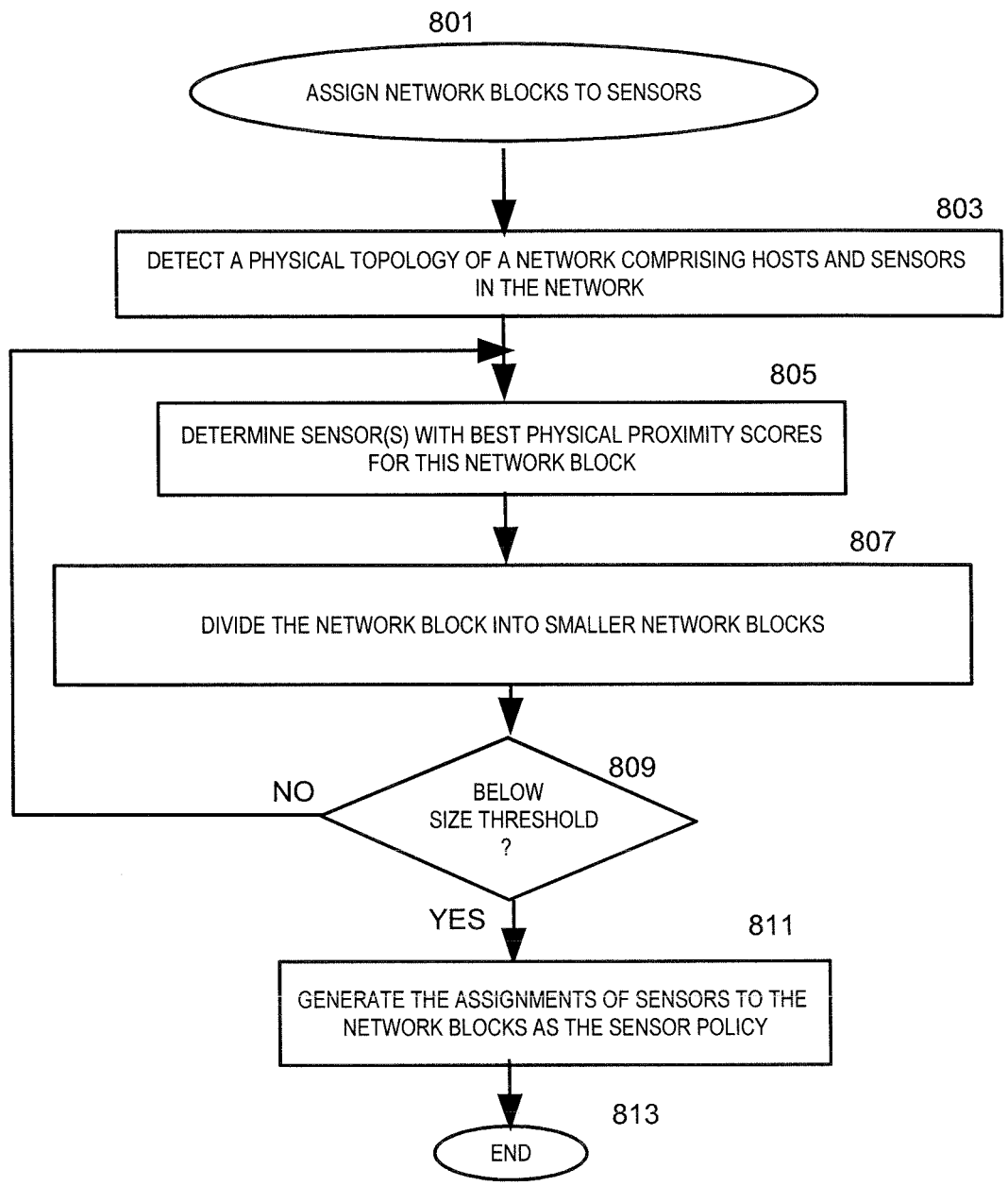
FIG. 8 is a flow chart illustrating a process for assigning network block to sensors.

Referring now to FIG. 8 is a flow chart illustrating a process 801 to assign network block to sensors will be discussed and described. The process 801 can advantageously be implemented on, for example, a processor of a controller described in connection with FIG. 7 or other apparatuses appropriately arranged.

In overview, the process 801 to assign network blocks to sensors can detect 803 a physical topology of the network; determine 805 the sensors best for the network block; divide 807 the network block into smaller network blocks, and repeat the process of determining 805 the sensors best for the network block and dividing 807 the network block; until 809 the network block is below a size threshold. Then, the process 801 can generate the assignments of sensors to the network blocks as the sensor policy, and end 813. Most of the details have been discussed above and are not repeated here.

Moreover, embodiments can include a computer system configured with the foregoing tangible computer-readable medium and/or method(s); and/or a communication network comprising at least one computer system configured with the foregoing computer-readable medium and/or method(s).

Although the foregoing discussion discusses passive detection of physical network topology, the network topology may be actively detected, manually determined via interaction with the user, and/or a combination of two or more of these detection methods.

It should be noted that the communication networks of interest include those that transmit information in packets in accordance with packet processing protocols, for example, by packet switching networks that transmit data, where the packet(s) are generated by a source, the packets are transmitted, and the packets are routed over network infrastructure devices, which are sent to a destination specified in the packet(s). Such networks include, by way of example, the Internet, intranets, local area networks (LAN), wireless LANs (WLAN), wide area networks (WAN), and others. Protocols supporting communication networks that utilize packets include one or more of various networking protocols having any link layers that support the TCP transport layer, or any application that rides over the transport layer, for example, IPV4 or IPV6, and other wireless application protocols or wireline application protocols and/or other protocol structures, and variants and evolutions thereof. Such networks can provide wireless communications capability and/or utilize wireline connections such as cable and/or a connector, or similar.

The designation "packet" is defined herein as a unit of data formatted in accordance with a packet processing protocol such as IPV4 or IPV6, carried by a packet switching network and includes a header and data, and is sometimes referred to as an IP packet or a datagram.

A "passively read" packet is defined herein as a packet which was not elicited or initiated by the processor on which the packet is read. To "passively read" data or a packet is defined herein as to receive a packet which was not elicited or initiated by a prior transmission from the processor on which the packet is read.

The designation "sensor", sometimes referred to as a "detection engine" or "DE", is defined herein expressly to indicate a device including a processor whose primary functions are to detect and report network traffic on the network to which it is attached, sometimes referred to as a security appliance, security device, or sensor appliance, and can be standalone or incorporate one or more of: a firewall, an anti-virus scanning device, a content filtering device, an intrusion detection appliance, an intrusion prevention appliance, a penetration testing appliance, a vulnerability assessment appliance, and the like. The sensor can operate inline (installed as an appliance within the network, so that traffic flows through it); as a tap (network traffic between the clients and servers is copied by the tap to the sensor which is essentially invisible to the other network entities); or in a span (traffic is spanned off either the server side or the client side of a router or switch, copying both the incoming and outgoing traffic from any of the ports). The sensor can collect information on the packets which it sees, and can be configured to transmit the collected packet information for individual packets, summaries of packets, reports, and/or as detected events. Examples of such sensors include a Sourcefire™ sensor, a McAfee™ sensor, and the like.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system, comprising:
a processor and memory configured to
detect a physical topology of a network comprising hosts and sensors in the network;
determine different divisions of hosts within a same one of network blocks of the network:
for each of the sensors,
determine distances between the sensor and each of the hosts in the different divisions of hosts within the same one of network blocks of the network, and
for each of the different divisions of hosts, assign a sensor-network block score to indicate physical proximity based on the distances between the sensor and each of the hosts in the each of the different divisions of hosts;
determine which one of the sensors to assign to one of the different divisions of hosts within the same network block of the hosts, based on which one of the sensors is physically closest the one of the different divisions of hosts within the same network block as indicated by the sensor-network block scores; and
generate a sensor policy that assigns the one of the sensors to monitor the one of the different divisions of hosts within the same network block of the hosts, based on the sensor-network block scores, wherein the processor is further configured to
iteratively divide and determine sensor-network block scores of smaller divisions of hosts within the network block; and
scale the sensor-network block scores that are assigned to prefer a larger network block over a smaller network block, when the different divisions of hosts within the network block are iteratively divided into smaller divisions of hosts within the network block.

2. The system of claim 1, wherein a sensor most suited to monitor the one of the different divisions of hosts is determined by recursively determining smaller and smaller divisions of hosts within the network block and determining which of the sensors has an overall shortest physical distance, as indicated by the sensor-network block scores, to each one of the smaller and smaller divisions of the network block.

3. The system of claim 1, further comprising transmitting the sensor policy to the sensors in the network to instruct the sensors as to which hosts to monitor.

4. The system of claim 1, further comprising displaying the sensor policy for assignment of the sensors, on a display to a user for acceptance of the sensor policy.

5. A method, comprising:
in a processor device,
detecting a physical topology of a network comprising hosts and sensors in the network;
determining different divisions of hosts within a same one of network blocks of the network; and
for each of the sensors,
determining distances between the sensor and each of the hosts in the different divisions of hosts within the same one of network blocks of the network, and
for each of the different divisions of hosts, assigning a sensor-network block score to indicate physical proximity based on the distances between the sensor and each of the hosts in the each of the different divisions of hosts;
determining which one of the sensors to assign to one of the different divisions of hosts within the same network block of the hosts, based on which one of the sensors is physically closest to the one of the different divisions of hosts within the same network block as indicated by the sensor-network block scores;

generating a sensor policy that assigns the one of the sensors to monitor the one of the different divisions of hosts within the same network block of the hosts, based on the sensor-network block scores;

iteratively dividing and determining sensor-network block scores of smaller divisions of hosts within the network block; and scaling the sensor-network block scores that are assigned to prefer a larger network block over a smaller network block, when the different divisions of hosts within the network block are iteratively divided into smaller divisions of hosts within the network block.

6. The method of claim 5, further comprising determining a sensor most suited to monitor the one of the different divisions of hosts by recursively determining smaller and smaller divisions of hosts within the network block and determining which of the sensors has an overall shortest physical distance, as indicated by the sensor-network block scores, to each one of the smaller and smaller divisions of the network block.

7. The method of claim 5, further comprising transmitting the sensor policy to the sensors in the network to instruct the sensors as to which hosts to monitor.

8. The method of claim 5, further comprising displaying the sensor policy for assignment of the sensors, on a display to a user for acceptance of the sensor policy.

9. A controller configured to perform the method of claim 5.

10. A non-transitory computer readable medium comprising executable instructions for performing the method of claim 5.

11. A non-transitory computer-readable storage medium comprising non-transitory computer-executable instructions for performing the steps of:

detecting a physical topology of a network comprising hosts and sensors in the network;

determining different divisions of hosts within a same one of network blocks of the network:

for each of the sensors, determining distances between the sensor and each of the hosts in the different divisions of hosts within the same one of network blocks of the network, and for each of the different divisions of hosts, assigning a sensor-network block score to indicate physical proximity based on the distances between the sensor and each of the hosts in the each of the different divisions of hosts;

determining which one of the sensors to assign to one of the different divisions of hosts within the same network block of the hosts, based on which one of the sensors is physically closest to the one of the different divisions of hosts within the same network block as indicated by the sensor-network block scores;

generating a sensor policy that assigns the one of the sensors to monitor the one of the different divisions of hosts within the same network block of the hosts, based on the sensor-network block scores;

iteratively dividing and determining sensor-network block scores of smaller divisions of hosts within the network block; and scaling the sensor-network block scores that are assigned to prefer a larger network block over a smaller network block, when the different divisions of hosts within the network block are iteratively divided into smaller division of hosts within the network block.

12. The non-transitory storage medium of claim 11, further comprising determining a sensor most suited to monitor the one of the different divisions of hosts by recursively determining smaller and smaller divisions of hosts within the network block and determining which of the sensors has an overall shortest physical distance, as indicated by the sensor-network scores, to each one of the smaller and smaller divisions of the network block.

13. The non-transitory storage medium of claim 11, further comprising transmitting the sensor policy to the sensors in the network to instruct the sensors as to which hosts to monitor.

14. The non-transitory storage medium of claim 11, further comprising displaying the sensor policy for assignment of the sensors, on a display to a user for acceptance of the sensor policy.

15. The system of claim 1, wherein the one of the sensors monitors by passively reading packets in motion on the network.

16. The method of claim 5, wherein the one of the sensors monitors by passively reading packets in motion on the network.

17. The non-transitory storage medium of claim 11, wherein the one of the sensors monitors by passively reading packets in motion on the network.

* * * * *